United States Patent [19]
Petruchik

[11] Patent Number: 5,815,738
[45] Date of Patent: Sep. 29, 1998

[54] COMPACT ONE-TIME-USE CAMERA

[75] Inventor: Dwight J. Petruchik, Honeoye Falls, N.Y.

[73] Assignee: Eastman Kodak Company, Rochester, N.Y.

[21] Appl. No.: 832,589

[22] Filed: Apr. 2, 1997

[51] Int. Cl.⁶ .................................................. G03B 17/02
[52] U.S. Cl. .............................. 396/6; 396/535; 396/537; 396/538
[58] Field of Search ................................ 396/6, 535, 537, 396/538, 539, 540, 541

[56] References Cited

U.S. PATENT DOCUMENTS 4,980,713  12/1990  Fujita et al. ............................ 396/514

FOREIGN PATENT DOCUMENTS 5-127249  5/1993  Japan .
8-146502  6/1996  Japan .

*Primary Examiner*—Eddie C. Lee
*Attorney, Agent, or Firm*—Roger A. Fields

[57] ABSTRACT

A one-time use camera comprising a body part which has a wall portion that at least partially defines a cartridge chamber, a film cartridge in the cartridge chamber, and a cover part for the body part, is characterized in that the wall portion has an opening which extends through the wall portion to form a discrete hole in the wall portion which is smaller than the film cartridge to permit only a section of the film cartridge to protrude into the hole to fill the hole, the film cartridge has a section that protrudes into the hole to fill the hole, and the cover part extends over the body part, but not to the hole, whereby the one-time-use camera is made more compact.

3 Claims, 4 Drawing Sheets

5,815,738

COMPACT ONE-TIME-USE CAMERA

FIELD OF THE INVENTION

The invention relates generally to the field of photography, and in particular to one-time-use cameras. More specifically, the invention relates to a one-time-use camera that is made relatively more compact than the typical one.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a film cartridge in a cartridge receiving chamber, a film take-up spool in a film supply chamber, a fixed-focus taking lens, a film metering mechanism with a rotatably supported metering sprocket, a manually rotatable film advance thumbwheel rotatably engaged with a film spool inside the film cartridge, a single-blade shutter, a manually depressible shutter release button, a frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially contains the camera unit and may have respective openings for the taking lens, the shutter release button, the film advance thumbwheel, the viewfinder, the frame counter, and a flash emission window for the electronic flash.

To use the one-time-use camera, after the photographer takes a picture, he or she manually rotates the thumbwheel in a film winding direction to rotate the film spool inside the film cartridge, to wind an exposed section of the filmstrip into the film cartridge. The rewinding movement of the filmstrip the equivalent of slightly more than one frame width rotates the metering sprocket (in engagement with the filmstrip) to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and rewound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from the film cartridge is attached to the film take-up spool, the film cartridge and the film take-up spool are loaded into the cartridge receiving and film supply chambers, and an intermediate leader section which bridges the film take-up spool and the film cartridge is engaged with the metering sprocket. Then, the front and rear cover parts are connected to the main body part and/or to the front cover part to complete the camera unit. Then, an engageable end of the take-up spool which protrudes from the film roll chamber is rotated to factory prewind substantially the entire length of the unexposed filmstrip from the film cartridge onto the film take-up spool and to rotate the metering sprocket to increment the frame counter to its total-available frame number setting. Lastly, the outer box is placed on the camera unit.

Early models of one-time-use cameras tended to be less than compact and, therefore, were difficult to fit into one's pocket or purse. There is a continuous desire to make one-time-use cameras more compact.

SUMMARY OF THE INVENTION

A one-time-use camera comprising a body part which has a wall portion that at least partially defines a cartridge chamber, a film cartridge in the cartridge chamber, and a cover part for the body part, is characterized in that:

the wall portion has an opening which extends through the wall portion to form a discrete hole in the wall portion which is smaller than the film cartridge to permit only a section of the film cartridge to protrude into the hole to fill the hole;

the film cartridge has a section that protrudes into the hole to fill the hole; and the cover part extends over the body part, but not to the hole, whereby the one-time-use camera is made more compact.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Preferred Embodiment

Figure 1:
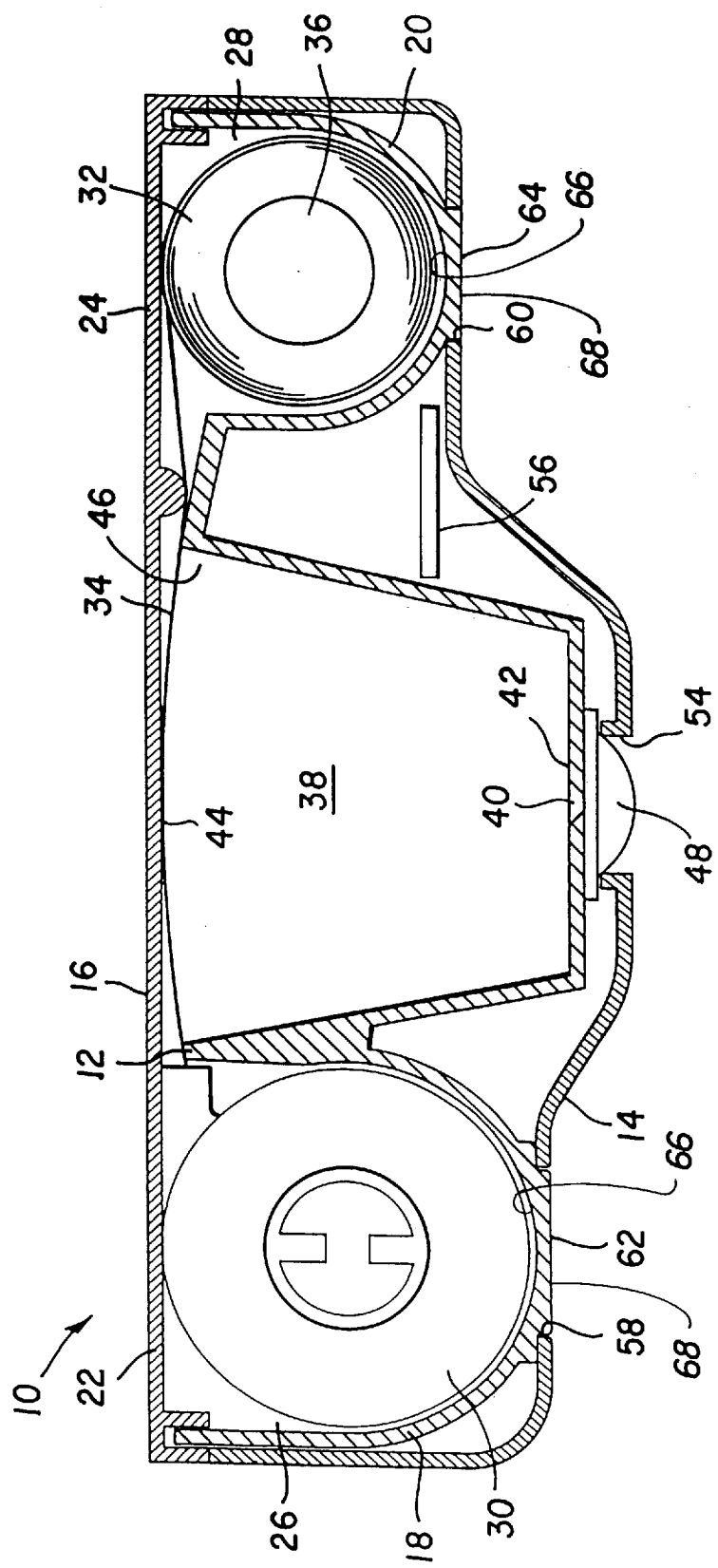
FIG. 1 is a plan sectional view of a compact one-time-use camera, which is a preferred embodiment of the invention.
Figure 2:
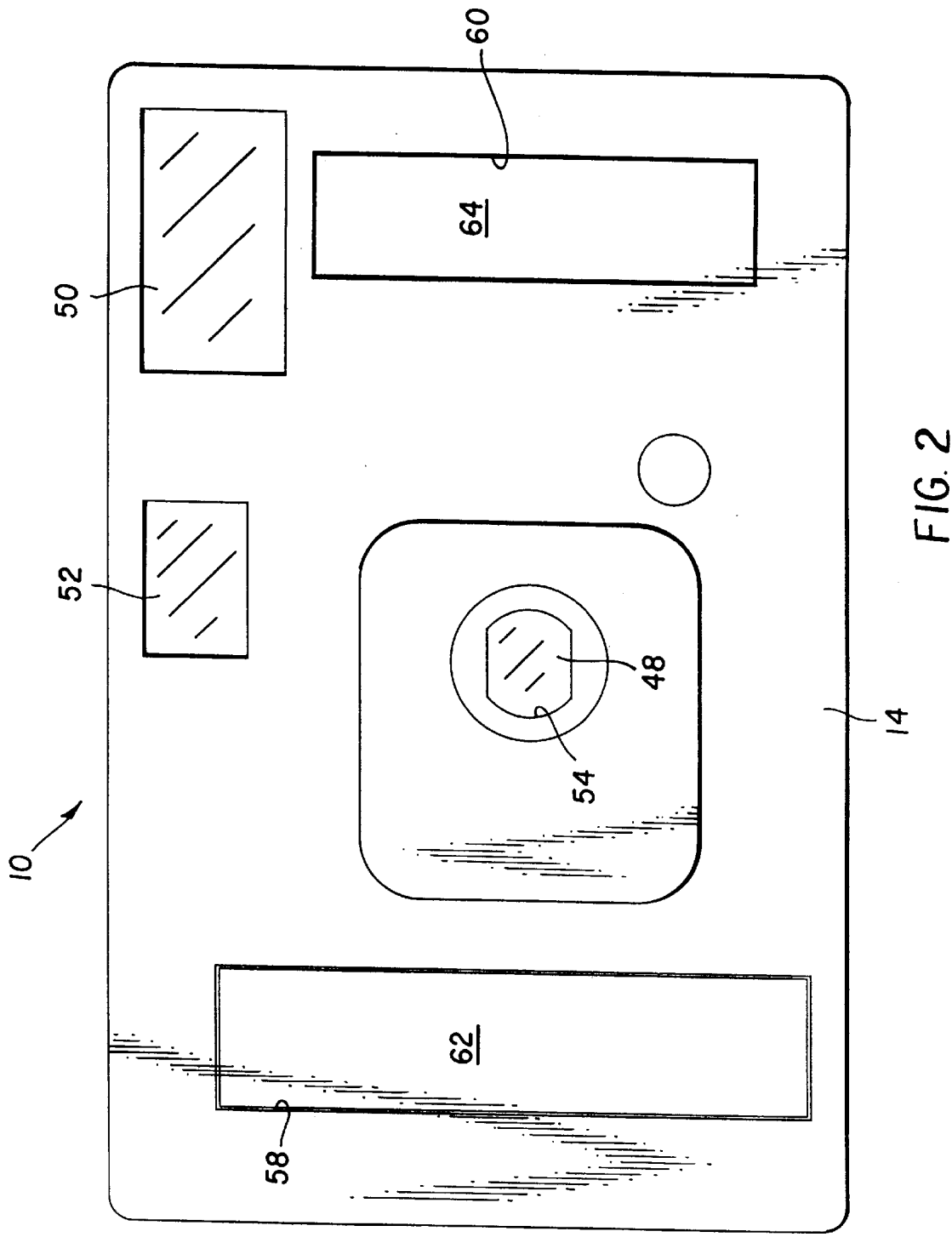
FIG. 2 is a front elevation view of the camera shown in FIG. 1.

Referring now to the drawings, FIGS. 1 and 2 show a one-time-use camera 10 comprising a main body part 12, a front cover part 14 and a rear cover part 16.

The main body part 12 has respective curved wall portions 18 and 20 that, with separate flat portions 22 and 24 of the rear cover part 16, define a light-tight concave cartridge chamber 26 and a light-tight concave film roll chamber 28 in the main body part. A conventional 35 mm. film cartridge 30 is loaded in the cartridge chamber 26. An unexposed film roll 32, including multiple convolutions of a 35 mm. filmstrip 34, is supported on a rotatable spool 36 in the film roll chamber 28. A double-end exposure chamber 38 in the main body part 12, between the cartridge and film roll chambers 26 and 28, is adapted to receive ambient light through a shuttered aperture 40 at a front end 42 of the exposure chamber to expose successive sections of the filmstrip 34 adjacent a rectangular backframe opening 44 at a rear end 46 of the exposure chamber. A taking lens 48 is positioned over the aperture 40, between the front end 42 of the exposure chamber 38 and the front cover part 14. After each section of the filmstrip 34 is exposed at the backframe opening 44, it is returned to the film cartridge 30 and a fresh section of the filmstrip is advanced from the unexposed film roll 32 to the backframe opening.

The front cover part 14 has a flash emission window 50, a front viewfinder window 52 and a lens opening 54 for the taking lens 48 as shown in FIG. 2. A flash circuit board 56 is positioned behind the front cover part 14 as shown in FIG. 1. A pair of discrete unconnected holes 58 and 60 are formed in the front cover part 14, in front of the cartridge chamber 26 and the film roll chamber 28.

The wall portion 18 of the main body part 12 that partially defines the cartridge chamber 28 protrudes snugly into the hole 58 in the front cover part 14 to fill that hole. See FIGS. 1 and 2. The wall portion 20 of the main body part 12 that partially defines the film roll chamber 28 protrudes snugly into the hole 60 in the front cover part 14 to fill that hole. The respective holes 58 and 60 are smaller than the wall portions 18 and 20 to permit only forward-most sections 62 and 64 of the wall portions to fill the holes. As a result, the one-time-use camera 10 is made relatively compact. The sections 62 and 64 of the wall portions 18 and 20 each have opposite curved and flat sides 66 and 68, one of which is in the chamber 26 or 28 and the other of which is in the hole 58 or 60 as shown in FIG. 1.

The front cover part 14 has a particular shaped exterior contour surrounding the hole 58 and the hole 60. The section 62 of the wall portion 18 that protrudes into the hole 58 has the same shaped contour in order to conform with the exterior contour of the front cover part 14 in the region of the hole to appear to be a continuation of the exterior contour. The section 64 of the wall portion 20 that protrudes into the hole 60 has the same shaped contour in order to conform with the exterior contour of the front cover part 14 in the region of the hole to appear to be a continuation of the exterior contour.

Alternate Embodiment

Figure 3:
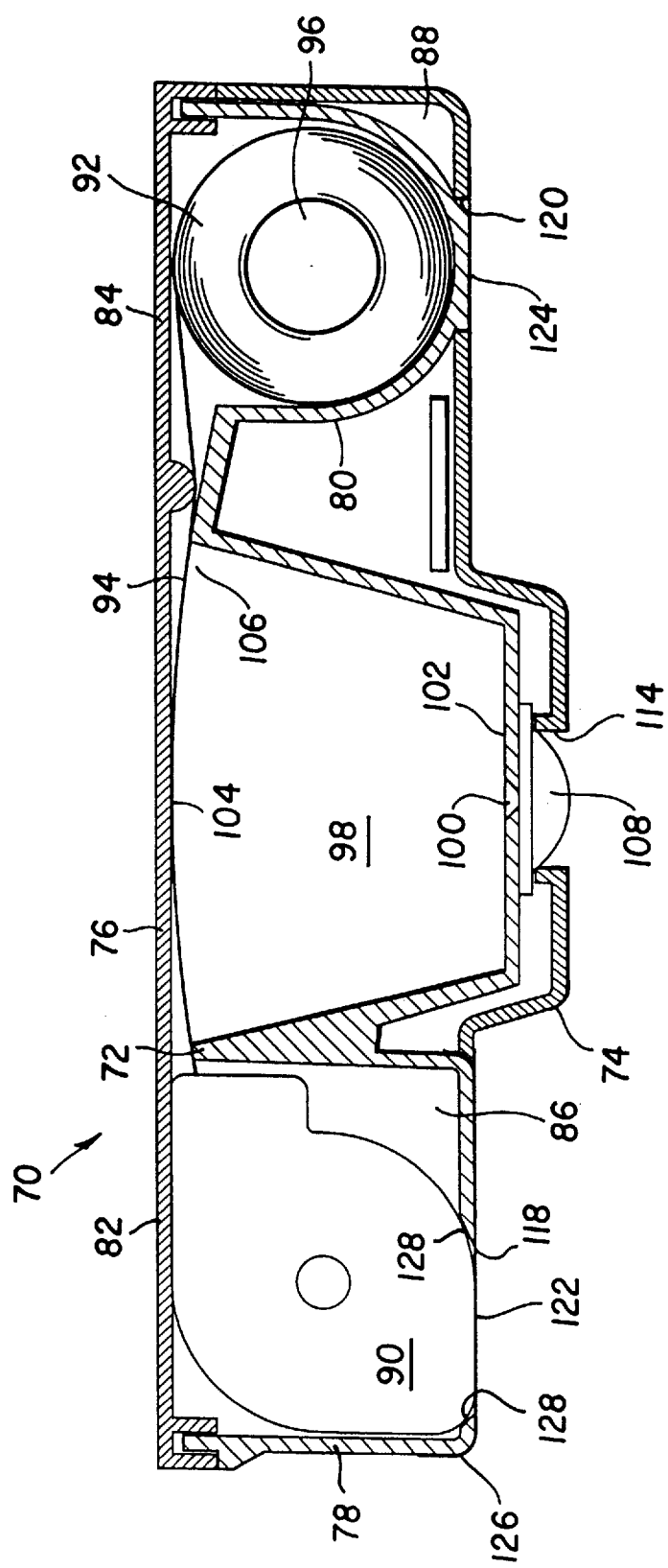
FIG. 3 is a plan sectional view of a compact one-time-use camera, which is an alternate embodiment of the invention.
Figure 4:
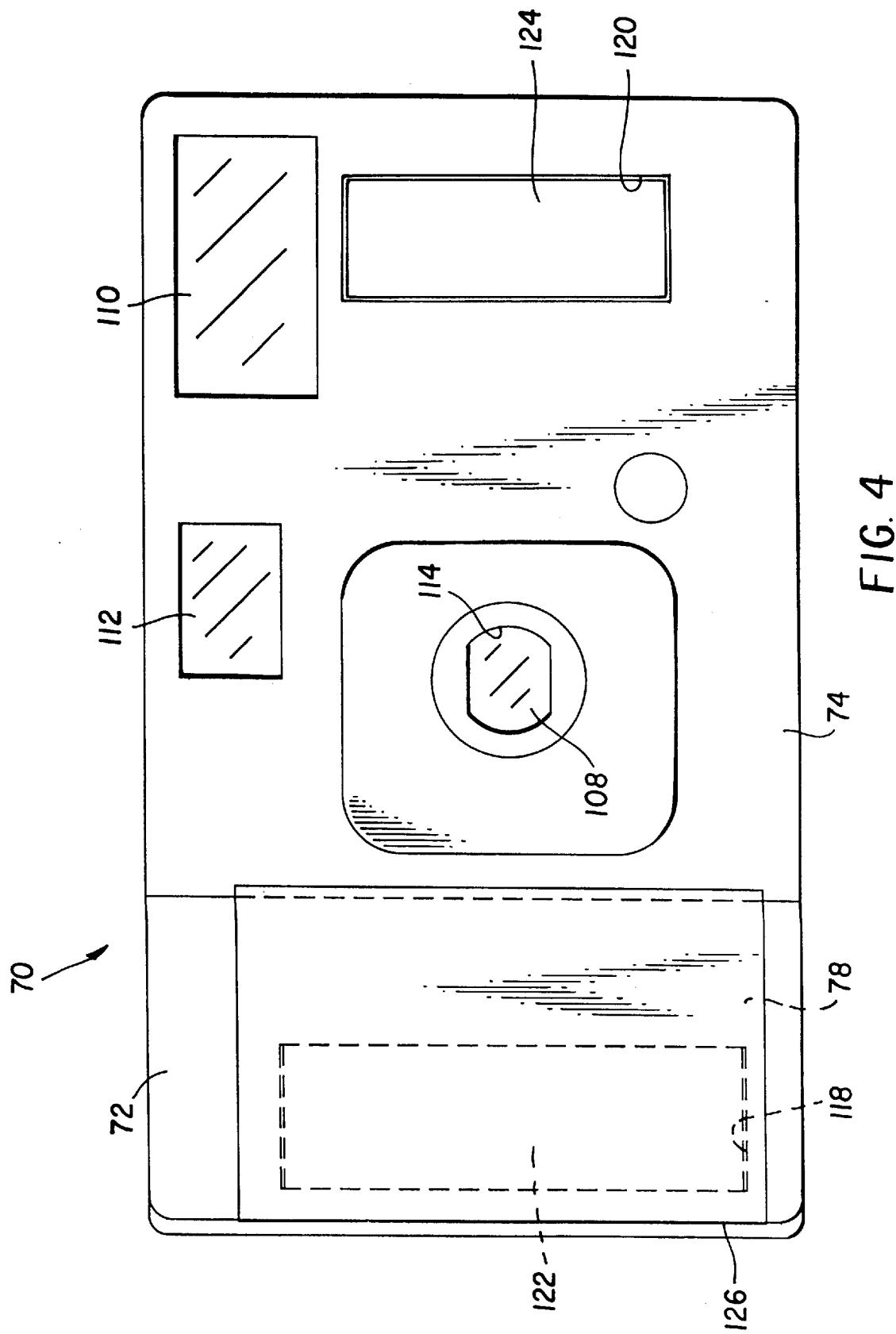
FIG. 4 is a front elevation view of the camera shown in FIG. 3.

FIGS. 3 and 4 show a one-time-use camera 70 comprising a main body part 72, a front cover part 74 and a rear cover part 76.

The main body part 72 has respective flat and curved wall portions 78 and 80 that, with separate flat portions 82 and 84 of the rear cover part 16, define a non-light-tight concave cartridge chamber 86 and a light-tight concave film roll chamber 88 in the main body part. A known "Advanced Photo System" (APS) film cartridge 90 is loaded in the cartridge chamber 86. An unexposed film roll 92, including multiple convolutions of an APS filmstrip 94, is supported on a rotatable spool 96 in the film roll chamber 88. A double-end exposure chamber 98 in the main body part 72, between the cartridge and film roll chambers 86 and 88, is adapted to receive ambient light through a shuttered aperture 100 at front end 102 of the exposure chamber to expose successive sections of the filmstrip 94 adjacent a rectangular backframe opening 104 at a rear end 106 of the exposure chamber. A taking lens 108 is positioned over the aperture 100, between the front end 102 of the exposure chamber 88 and the front cover part 74. After each section of the filmstrip 94 is exposed at the backframe opening 104, it is returned to the film cartridge 90 and a fresh section of the filmstrip is advanced from the unexposed film roll 92 to the backframe opening.

The front cover part 74 has a flash emission window 110, a front viewfinder window 112 and a lens opening 114 for the taking lens 108 as shown in FIG. 4. A flash circuit board 116 is positioned behind the front cover part 74 as shown in FIG. 3. A hole 118 is formed in the wall portion 78 of the main body part 72, in front of the cartridge chamber 86. The front cover part 74 is spaced from the hole 118. A hole 120 is formed in the front cover part 74, in front of the film roll chamber 88.

The film cartridge 90 protrudes snugly into the hole 118 in the wall portion 78 of the main body part 72 to fill that hole. See FIGS. 3 and 4. The wall portion 80 of the main body part 72 protrudes snugly into the hole 120 in the front cover part 74 to fill that hole. The respective holes 118 and 120 are smaller than the film cartridge 90 and the wall portion 80 to permit only forward-most sections 122 and 124 of the film cartridge and the wall portion to fill the holes. As a result, the one-time-use camera 70 is made relatively compact.

The front cover part 74 has a particular shaped exterior contour surrounding the hole 118 and the hole 120. The section 122 of the film cartridge 90 that protrudes into the hole 118 has the same shaped contour in order to conform with the exterior contour of the front cover part 74 in the region of the hole to appear to be a continuation of the exterior contour. The section 124 of the wall portion 80 that protrudes into the hole 120 has the same shaped contour in order to conform with the exterior contour of the front cover part 74 in the region of the hole to appear to be a continuation of the exterior contour.

A label 126 covers the hole 118. The label 126 has an adhesive on its underside which is located to contact the main body part 17, but not to contact the section 122 of the film cartridge 90 in the hole 118. See FIG. 3. This prevents the label 126 from sticking to the section 122 of the film cartridge 90, which would make it difficult to remove the film cartridge from the cartridge chamber 86. The label 126 is opaque to prevent ambient light from entering the cartridge chamber 86 through the hole 118. A light-trapping plush 128 lines the juncture between the hole 118 and the section 122 of the film cartridge 90 for the same purpose.

The invention has been described with reference to a preferred embodiment. However, it will be appreciated that variations and modifications can be effected by a person of ordinary skill in the art without departing from the scope of the invention. For example, one or both of the respective sections 62 and 64 of the wall portions 18 and 20 could project from the holes 58 and 60 in the front cover part 14 to serve as handgrips.

PARTS LIST 10. one-time-use camera
12. main body part
14. front cover part
16. rear cover part
18. curved wall portion
20. curved wall portion
22. flat portion
24. flat portion
26. cartridge chamber 28. film roll chamber
30. film cartridge
32. unexposed film roll
34. filmstrip
36. spool
38. exposure chamber
40. aperture
42. front end
44. backframe opening
46. rear end
48. taking lens
50. flash emission window
52. front viewfinder window
54. lens opening
56. flash circuit board
58. hole
60. hole
62. section
64. section
66. curved sides
68. flat sides
70. one-time-use camera
72. main body part
74. front cover part
76. rear cover part
78. flat wall portion
80. curved wall portion
82. flat portion
84. flat portion
86. cartridge chamber
88. film roll chamber
90. film cartridge
92. unexposed film roll
94. filmstrip
96. spool
98. exposure chamber
100. aperture
102. front end
104. backframe opening
106. rear end
108. taking lens
110. flash emission window
112. front viewfinder window
114. lens opening
116. flash circuit board
118. hole
120. hole
122. section
124. section
126. label
128. light-trapping plush

What is claimed is:

1. A one-time-use camera comprising a body part which has a wall portion that at least partially defines a cartridge chamber, a film cartridge in said cartridge chamber, and a cover part for said body part, is characterized in that:

said wall portion has an opening which extends through the wall portion to form a discrete hole in the wall portion which is smaller than said film cartridge to permit only a section of the film cartridge to protrude into the hole to fill the hole;

said film cartridge has a section that protrudes into said hole to fill the hole; and said cover part extends over said body part, but not to said hole, whereby said one-time-use camera is made more compact.

2. A one-tine-use camera as recited in claim 1, wherein an opaque label not a portion of said cover part covers said hole.

3. A one-time-use camera as recited in claim 1, wherein a continuous juncture between said film cartridge and said hole is lined with light-trapping plush to prevent ambient light from entering said cartridge chamber through the hole.

* * * * *